US012799822B2

(12) United States Patent
Wallace et al.

(10) Patent No.: US 12,799,822 B2
(45) Date of Patent: Nov. 17, 2026

(54) CABLE GUIDE FOR FALL PROTECTION SYSTEM

(71) Applicant: 3M INNOVATIVE PROPERTIES COMPANY, St. Paul, MN (US)

(72) Inventors: Jamie Wallace, Christchurch (NZ); Ben Hughes, Christchurch (NZ); Andy Kimber, Christchurch (NZ); Peter Scott, Christchurch (NZ); Andrew K. Thomforde, Goodhue, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 635 days.

(21) Appl. No.: 18/283,578

(22) PCT Filed: Mar. 4, 2022

(86) PCT No.: PCT/IB2022/051954
§ 371 (c)(1),
(2) Date: Sep. 22, 2023

(87) PCT Pub. No.: WO2022/208186
PCT Pub. Date: Oct. 6, 2022

(65) Prior Publication Data

US 2024/0167336 A1 May 23, 2024

Related U.S. Application Data

(60) Provisional application No. 63/170,012, filed on Apr. 2, 2021.

(51) Int. Cl.
*E06C 7/18* (2006.01)
*A62B 35/00* (2006.01)

(52) U.S. Cl.
CPC ............ *E06C 7/186* (2013.01); *A62B 35/005* (2013.01); *A62B 35/0068* (2013.01)

(58) Field of Classification Search
CPC ......... E06C 7/186; E06C 7/18; A62B 35/005; A62B 35/0068; A62B 35/0043; A62B 35/0087
See application file for complete search history.

(56) References Cited

U.S. PATENT DOCUMENTS 3,908,791 A * 9/1975 Kleine .................... E06C 7/186 182/8
5,265,696 A 11/1993 Casebolt
5,964,316 A * 10/1999 Roy ................... A62B 35/0068 182/8

(Continued)

FOREIGN PATENT DOCUMENTS

AU 2019257490 B2 * 12/2025 ......... E04G 21/3219
JP 2016002152 A 1/2016
WO 2019126135 A1 6/2019

OTHER PUBLICATIONS

AU 2019257490 B2 (Year: 2020).*

(Continued)

*Primary Examiner* — David E Martinez
(74) *Attorney, Agent, or Firm* — Kenneth B. Wood

(57) ABSTRACT

A cable guide for stabilizing a safety cable of a fall protection system. The cable guide includes an elongate member with an engaging end that is arcuately deflectable relative to a stationary end of the elongate member and that comprises a magnet.

20 Claims, 8 Drawing Sheets

(56) References Cited

U.S. PATENT DOCUMENTS

| | | | | | |
|---|---|---|---|---|---|
| 5,979,599 | A * | 11/1999 | Noles | A62B 35/0087 182/36 |
| 6,056,085 | A * | 5/2000 | Cutter | A62B 35/0068 182/36 |
| 6,511,249 | B2 * | 1/2003 | Pelofi | E04G 21/3295 441/84 |
| 9,132,297 | B2 | 9/2015 | Casebolt et al. | |
| 10,486,002 | B1 * | 11/2019 | Drinkwater | E06C 7/18 |
| 10,619,417 | B2 * | 4/2020 | Ostrobrod | A62B 35/0087 |
| 11,480,013 | B2 * | 10/2022 | Adams | A62B 35/0037 |
| 2012/0073901 | A1 | 3/2012 | Virus-Tetzlaff | |
| 2013/0048421 | A1 | 2/2013 | Midtgaard | |

OTHER PUBLICATIONS

"3M LAD-SAF Flexible Cable Safety Systems Installation", 3M DBI Sala Fall Protection Installation Instructions, 2020, pp. 1-288.

International Search Report for PCT International Application No. PCT/IB2022/051954, mailed on May 24, 2022, 3 pages.

* cited by examiner

CABLE GUIDE FOR FALL PROTECTION SYSTEM

CROSS REFERENCE TO RELATED APPLICATIONS

This application is a national stage filing under 35 U.S.C. 371 of PCT/IB2020/051954, filed 4 Mar. 2022, which claims the benefit of U.S. Provisional Patent Application No. 63/170,012, filed 2 Apr. 2021, the disclosure of which is incorporated by reference in its/their entirety herein.

BACKGROUND

Fall protection systems are often used to enhance worker safety e.g. when climbing, descending, or otherwise using a climbing facility (e.g. a ladder) in the course of constructing or servicing telecommunication towers, water towers, distillation towers, smokestacks, wind turbines, oil rigs, cranes, or any elevated (or descending) structure.

SUMMARY

In broad summary, herein is disclosed a cable guide for stabilizing a safety cable of a fall protection system. In one aspect, the cable guide comprises an elongate member with an engaging end that is arcuately deflectable and that comprises a magnet. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not necessarily to scale and are chosen for the purpose of illustrating different embodiments of the invention. In particular the dimensions of the various components are depicted in illustrative terms only, and no relationship between the dimensions of the various components should be inferred from the drawings, unless so indicated.

Figure 3:
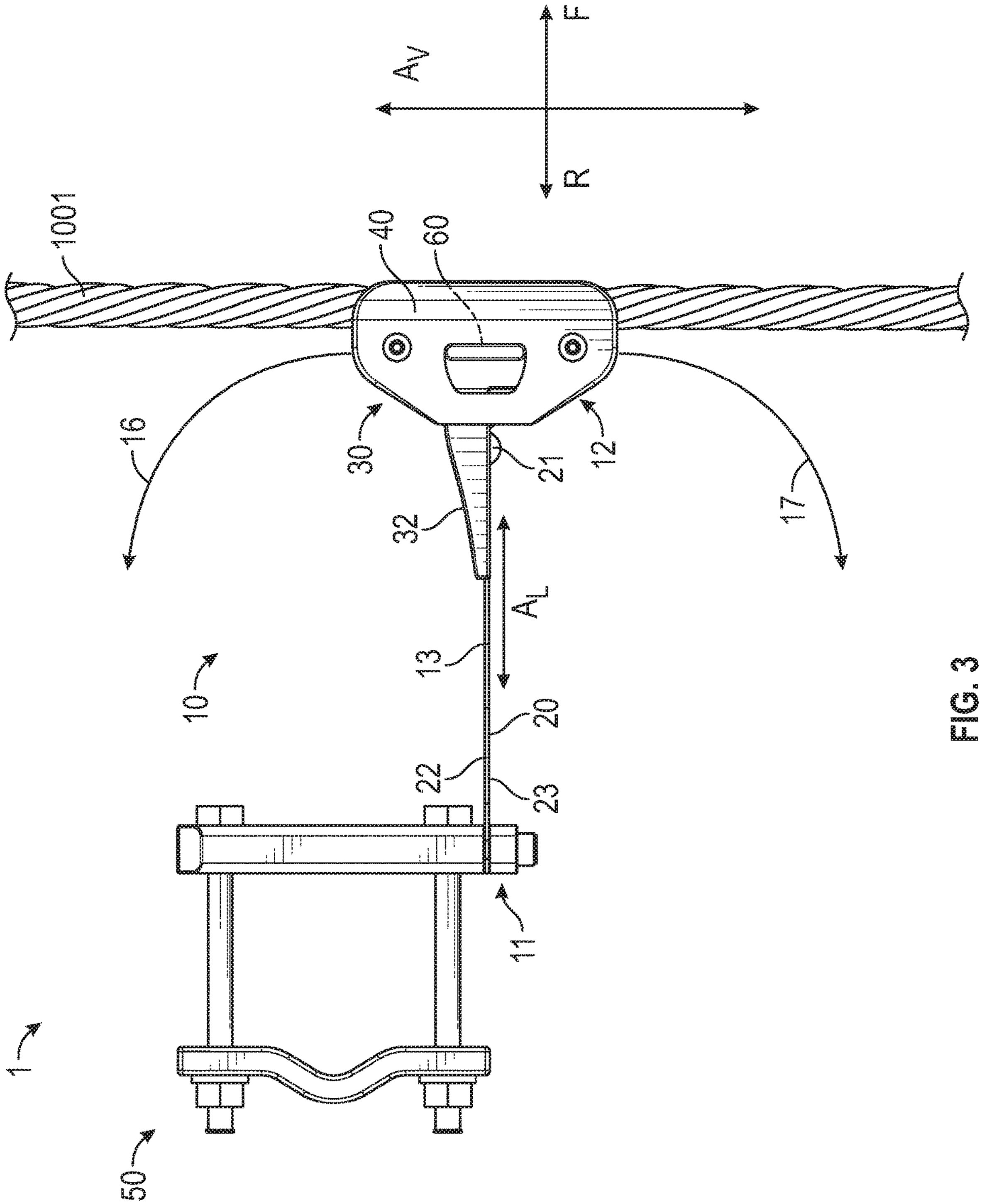
FIG. 3 is a side view of an exemplary cable guide with a safety cable engaged thereto.

Although terms such as first and second may be used in this disclosure, it should be understood that those terms are used in their relative sense only unless otherwise noted. Terms such as vertical, and upward and downward directions along the vertical axis, will have their ordinary meaning with respect to the Earth. Terms such as forward and rearward are defined with respect to a cable guide; forward denotes a direction generally toward a safety cable that is engaged with the cable guide; rearward denotes a direction generally away from the safety cable, e.g. toward a bracket that is used to fix a stationary end of the cable guide to a support structure such as a ladder. The vertical axis $A_v$, and forward and rearward directions F and R, are indicated in FIG. 3 for clarity.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein is a cable guide for use in a fall protection safety system 1000. Such a fall protection safety system will often be a vertical fall protection safety system, provided e.g. to facilitate the use of a ladder 1020. As shown in exemplary embodiment in FIG. 1, such a safety system often comprises at least a top bracket 1010, a bottom bracket 1040, and a safety cable 1001. Often, top bracket 1010 is attached to a top rail 1030, which is attached to, or is a part of, a secure support (e.g. a permanently installed ladder). An upper end 1002 of safety cable 1001 is connected to top bracket 1010 with a lower end 1003 of safety cable 1001 being connected to a bottom bracket 1040, which may in turn be connected to a bottom rail 1041. The system may include a tensioning device 1042 (which may be conveniently located near bottom bracket 1040) which allows an appropriate tension to be applied to cable 1001.

Figure 1:
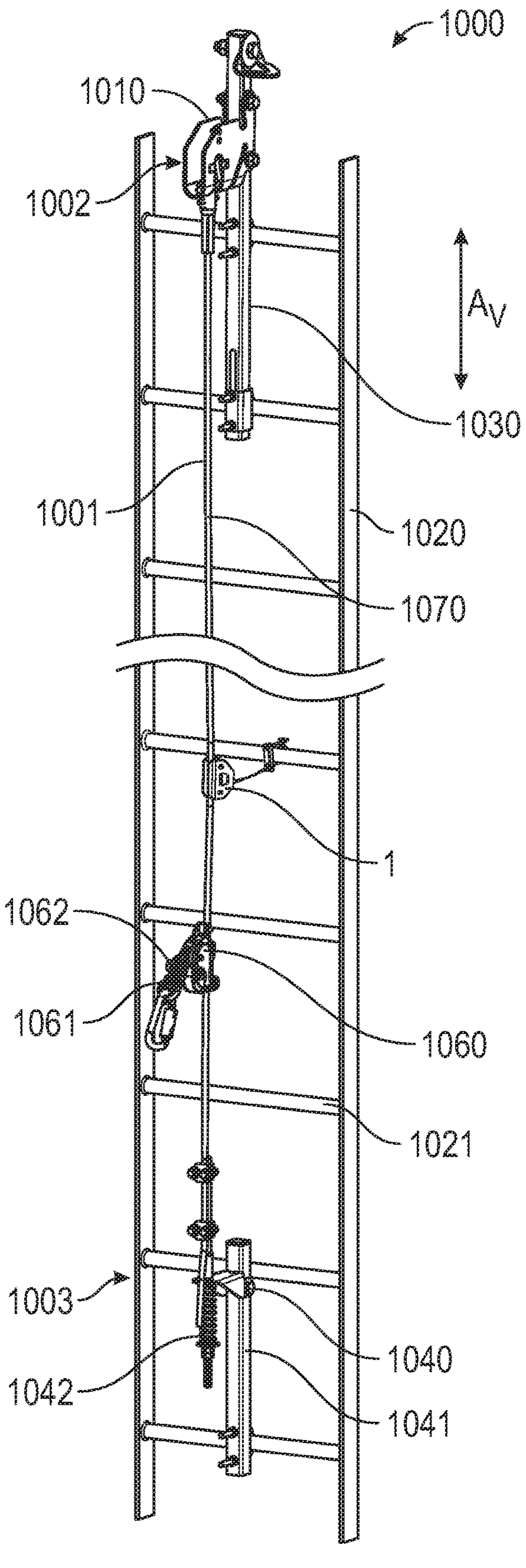
FIG. 1 is a perspective view of an exemplary ladder fitted with an exemplary fall protection system comprising a safety cable and a cable guide.

Such a fall protection system may further include a cable sleeve 1060 (shown in exemplary embodiment in FIG. 1, although any cable sleeve of any suitable design may be used). Such a sleeve will often comprise a connection 1061 that can be connected to a harness worn by a worker. Cable sleeve 1060 is configured (e.g. with rollers) to travel along cable 1001 e.g. as the worker climbs upward or downward, and can be configured to lock up (or to travel downward at a slow, controlled speed) in the event of a worker fall, thus slowing and/or arresting the fall of the worker. In some embodiments a cable sleeve 1060 may comprise a shock absorber 1062 (of any suitable design, e.g. a tear web, tear strip, or the like) that can act to reduce the forces encountered by the worker during a fall arrest. Cable sleeves are described in detail in, for example, U.S. Pat. No. 9,132,297.

Disclosed herein is a cable guide 1 that can be used to stabilize a safety cable 1001 of a fall protection system 1000. As noted above, such a safety cable 1001 will extend between top and bottom brackets 1010 and 1040 and will be attached thereto. The top and bottom brackets (in particular, the top bracket) are load-bearing items that are configured to withstand any large-scale forces that develop in a direction generally aligned with the longitudinal axis of cable 1001 e.g. in the event of a user fall. Such brackets, and fall protection systems in general, are described in detail in International Patent Application (PCT) Publication WO 2019/126135 and in the resulting U.S. patent application Ser. No. 15/733,190, both of which are incorporated by reference in their entirety herein.

A cable guide 1 as disclosed herein is an ancillary item that can be installed at one or more locations along the elongate length of a safety cable 1001, e.g. between the top and bottom brackets, to stabilize the safety cable. By this is meant that the cable guide can maintain cable 1001 in a desired position against forces that act in a direction generally normal (perpendicular) to the longitudinal axis of the cable. Guide 1 can thus provide that cable 1001 is not, for example, buffeted by winds in such manner as would cause cable 1001 to contact ladder 1020 so as to cause wear or damage to cable 1001 or to ladder 1020, to cause undesirable noises, and so on. It will be appreciated that a cable guide 1 as disclosed herein is not a load-bearing item in the sense of, e.g., a top bracket of a fall protection safety system.

Any number of cable guides 1 may be installed along the elongate length of a safety cable 1001. In many instances, such guides may be spaced along the cable at intervals of e.g. 20-40 feet, with the intervals optionally being staggered to reduce any harmonic or resonance effects. Often, such a cable guide 1 may be conveniently attached to a rung 1021 of a ladder 1020 with which the safety system 1000 is used, as in the exemplary depiction of FIG. 1. However, such a guide may be attached to any component or item that suitably supports the cable guide.

Figure 2:
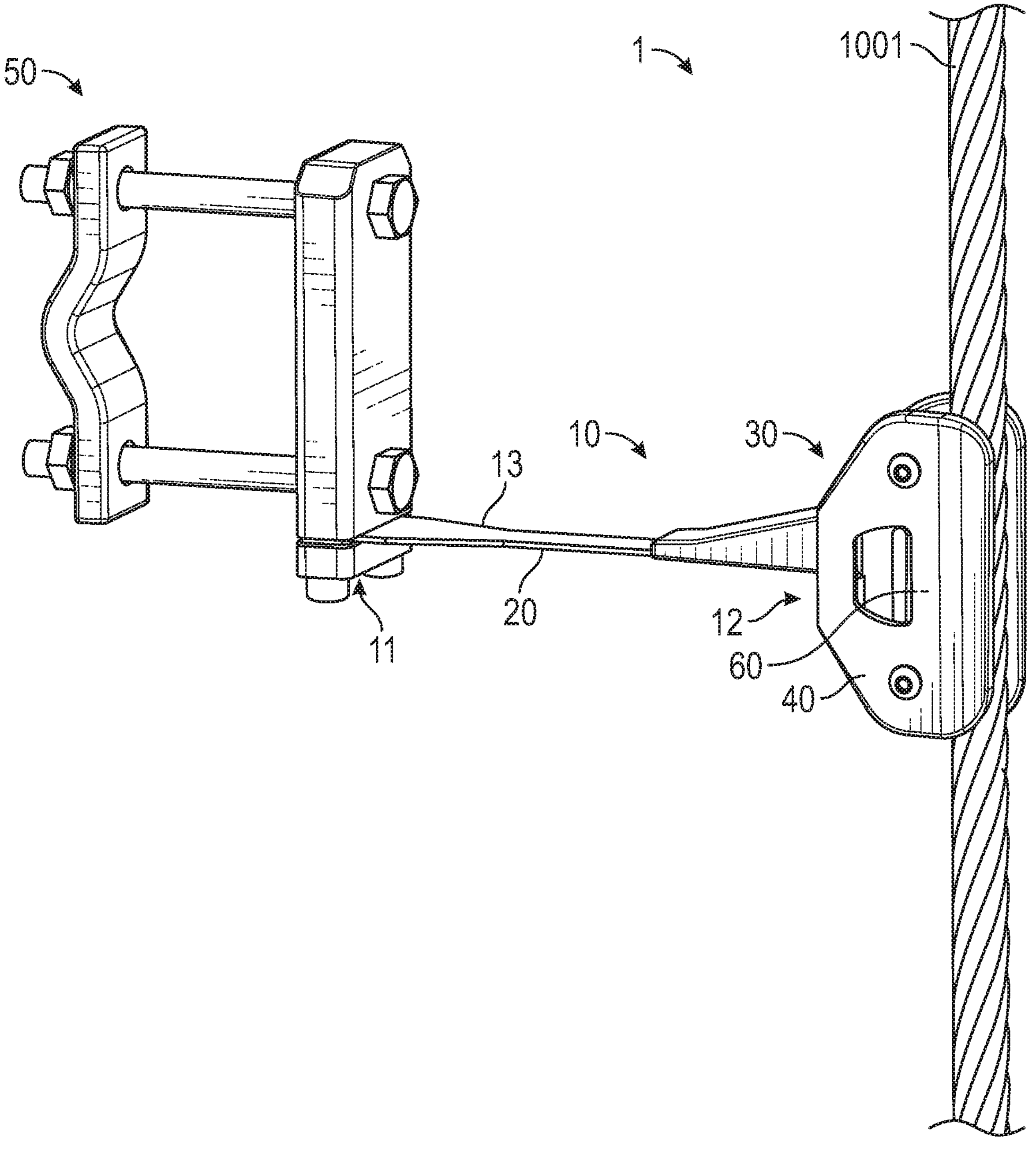
FIG. 2 is a perspective view of an exemplary cable guide with a safety cable engaged thereto.

An exemplary cable guide 1 as disclosed herein is shown in perspective view in FIG. 2 and in side view in FIG. 3. Cable guide 1 comprises an elongate member 10 that comprises a longitudinal axis $A_L$ (indicated in FIG. 3), a stationary (rearward) end 11, and an engaging (forward) end 12 that is distal to stationary end 11. Stationary end 11 can be attached to (or can be integrally connected to, e.g. can be a part of) any suitable bracket 50 which may in turn be attached to any suitable support, e.g. to a rung 1021 of a ladder 1020. Certain types of brackets are illustrated in the Figures herein; however, they are not described in detail and any type of bracket may be used. Engaging end 12 of elongate member 10 comprises at least one magnet 60 (not visible in FIGS. 2 and 3, but indicated in general, and shown in detail later herein). Magnet 60 allows engaging end 12 of elongate member 10 to be magnetically, disengagably engaged with a suitable safety cable (i.e. a cable comprised of a magnetically susceptible metal as discussed later herein). In many embodiments such a magnet or magnets 60 may be mounted in an engaging head 30 (e.g. made of molded plastic) as discussed in detail later herein.

As disclosed herein, a cable guide 1 comprises an elongate member 10 with an engaging end 12 that is arcuately deflectable relative to the stationary end 11 of the elongate member 10. In some embodiments, this arcuate deflectability is along an arcuate path that lies in, and is confined to, a single, predetermined plane. Such an arrangement is illustrated in the side view of FIG. 3. Arrows 16 and 17 indicate upward and downward arcuate paths along which engaging end 12 can move; both of these paths lie in a plane that is in-plane with FIG. 3 as viewed. In other words, the engaging end 12 can move vertically upward or downward along a curved path (e.g. upward to a position indicated in FIG. 4) but it cannot move horizontally, nor can it move sideways at an angle that is intermediate between vertical and horizontal.

Figure 4:
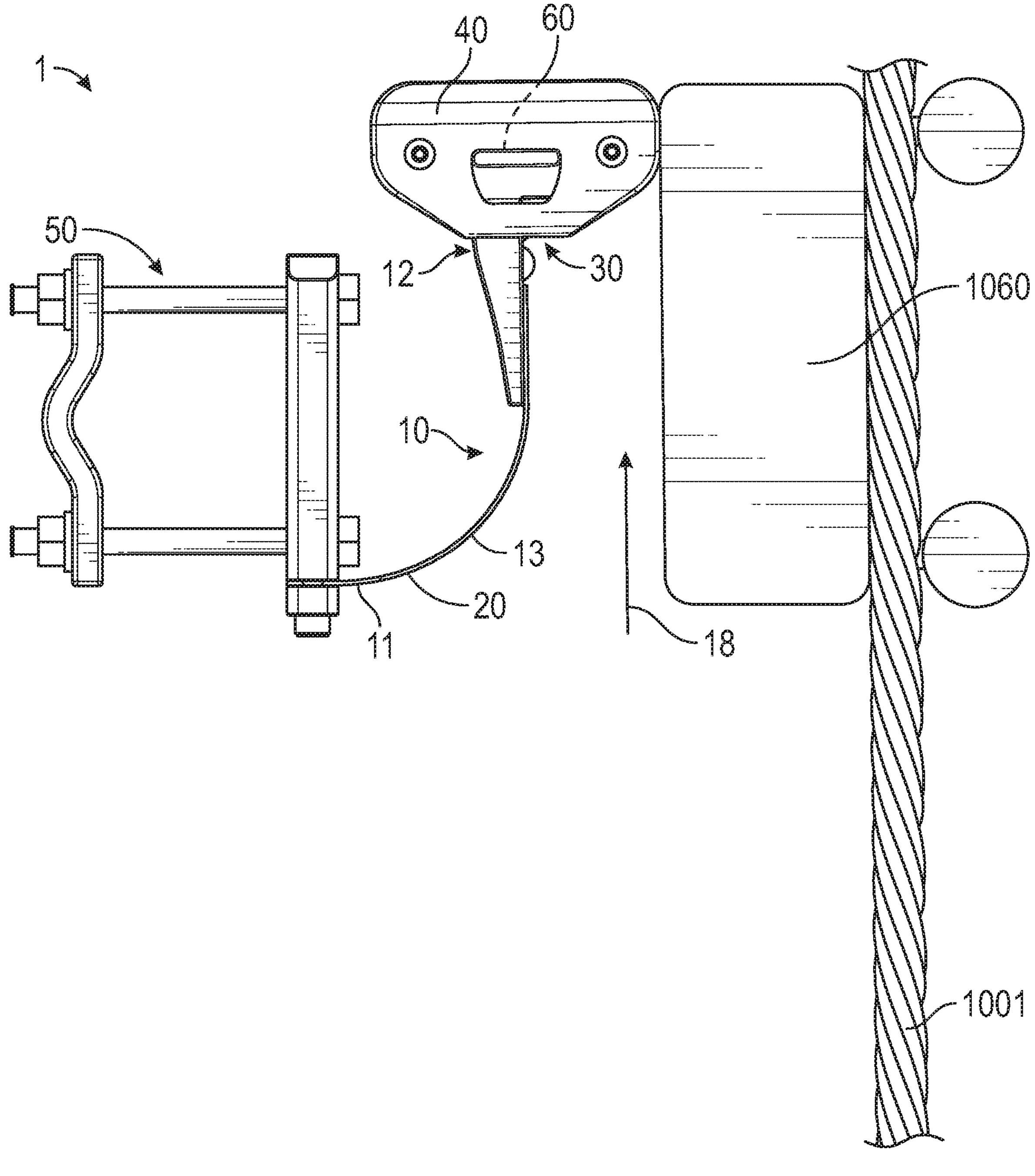
FIG. 4 is a side view of an exemplary cable guide having been disengaged from a safety cable.

Elongate member 10 is biased so that in the absence of any external force, the engaging end 12 of elongate member 10 is urged, along an above-described arcuate path, into a first, home position as shown in FIG. 2. Upon application of a sufficient external force (e.g. by the impinging of a cable slide on the engaging end 12 of elongate member 10), the biasing force is overcome and the engaging end 12 will be deflected, along the above-described arcuate path, into a second, deflected position as shown in exemplary embodiment in FIG. 4. When in the first, home position, the engaging end of the cable guide is engaged with the safety cable as shown in FIG. 2; when in the second, deflected position, the engaging end of the cable guide is disengaged from the safety cable as shown in FIG. 4. Upon the cessation of the external force (e.g. when the cable guide has moved farther along the safety cable), the biasing force will cause the engaging end of the cable guide to return to the first, home position so as to reengage with the safety cable.

One exemplary way in which such arrangements can be achieved is by providing that elongate member 10 comprises an elongate metal sheet 20. As most easily seen in the isolated perspective view of FIG. 5 (in which the bracket and the safety cable are omitted), such an elongate piece of sheet metal 20 will exhibit a long axis that defines the long axis $A_L$ of the elongate member. The elongate metal sheet 20 will also exhibit a major plane that will be parallel to the major top surface 22 and/or to the major bottom surface 23 of piece 20. Any such major plane of sheet 20, the long axis of such a sheet, etc., will be identified while sheet 20, and elongate member 10 as a whole, are in the first, home position as in FIGS. 2-3 and 5, rather than in a deflected condition as in FIG. 4.

It will be apparent that such an elongate metal sheet 20, configured in this matter, can readily and reversibly deflect (bend) in a particular direction (e.g. upward or downward, in the depicted Figures) but will be much less able to bend in any other direction (e.g. sideways). This can provide that the single, predetermined plane in which the engaging end 12 of the elongate member 10 is arcuately deflectable, will be parallel to the long axis of the elongate piece of sheet metal 20 and will be perpendicular to the major plane of the elongate piece of sheet metal. In many embodiments, this single, predetermined plane will also be parallel to the long axis of the safety cable 1001 that is engaged with the cable guide, as evident from FIGS. 2-4.

Any suitable sheet metal may be used, made of any suitable material, e.g. spring steel, stainless steel, or the like. The metal should be able to undergo the desired arcuate deflection without undergoing any plastic or permanent deformation or fatigue, and should have an appropriate bending stiffness (flexural modulus) to provide the desired biasing force. The piece of metal should be sheet-like, e.g. with an aspect ratio of average thickness (in the thinnest dimension of the piece), to average width (across the transverse dimension of the piece) of at least 10:1, 15:1, 20:1, or 25:1. Suitable pieces of sheet metal may often resemble metal (e.g. steel) shimstock in appearance and/or character. The geometry of the piece (e.g. the length, transverse width, thickness, and so on) may be chosen to as to impart the desired bending characteristics. In various embodiments the thickness of the metal may be less than 2.0, 1.0, 0.8, 0.6, or 0.4 mm; in further embodiments, the thickness of the metal may be at least 0.1, 0.2, or 0.3 mm.

Figure 5:
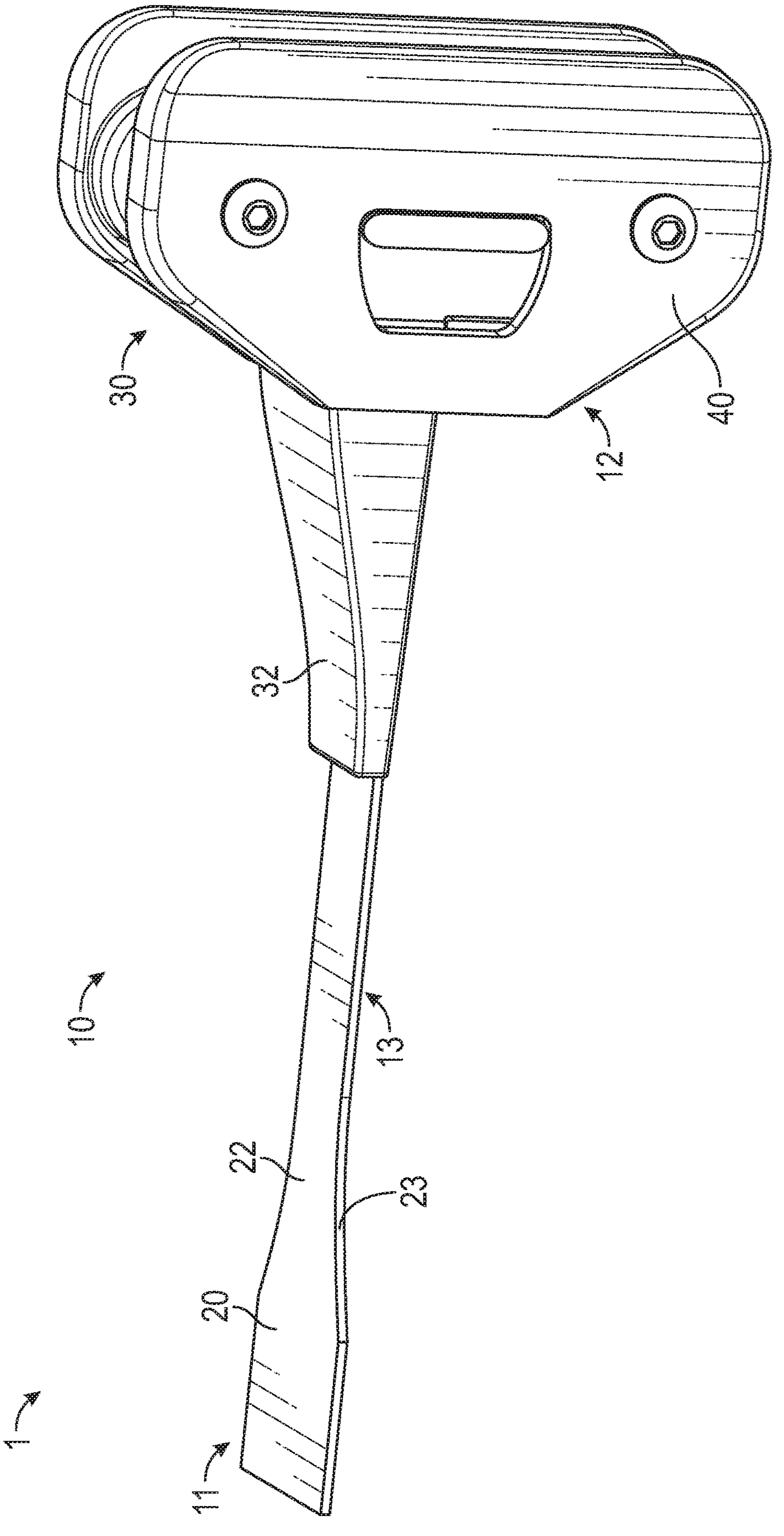
FIG. 5 is a perspective view of an exemplary cable guide.
Figure 6:
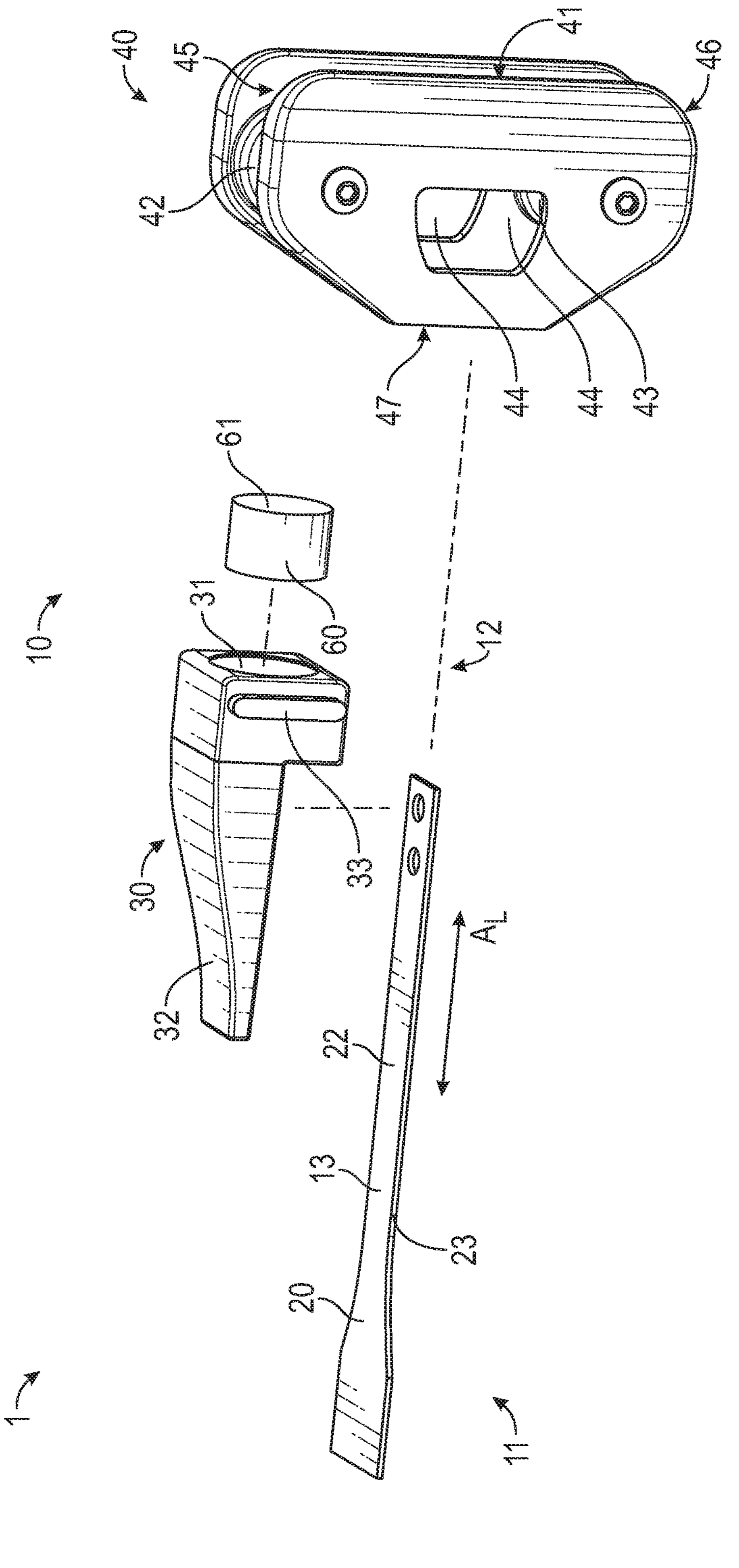
FIG. 6 is a partially exploded view of the exemplary cable guide of FIG. 5.

In some embodiments, the engaging end 12 of elongate member 10 may comprise an engaging head 30 as visible in FIG. 5 and as specifically denoted in the exploded view of FIG. 6. In some embodiments such an engaging head 30 may be non-detachably attached to a distal end of the elongate piece of sheet metal 20, e.g. by one or more rivets (one such rivet 21 is visible in FIG. 7). In some embodiments, engaging head 30 may be attached to the piece of sheet metal 20 so that head 30 is non-movable relative to piece 20. Engaging head 30 (which, in many convenient embodiments, may be a molded piece of plastic) may comprise one or more receptacles 31 that can accommodate one or more magnets 60 as shown in FIG. 6. In many embodiments, any such receptacle will be located at the forward end of engaging head 30 and will be forward-facing (as evident in FIG. 6) so that magnet 60 can most effectively interact with a safety cable as discussed later herein.

In some embodiments, cable guide 1 may comprise (whether as an integral extension of engaging head 30, or as a separately-made piece that is attached to engaging head 30) a stiffening element (e.g. a spar) 32 as shown in exemplary embodiment in FIG. 6. As evident in FIGS. 3 and 5, stiffening spar 32 can extend rearward along at least one major surface of the elongate piece of sheet metal 20. The presence of stiffening spar 32 can reduce the ability of the metal sheet 20 to bend in locations where the sheet is abutted by spar 32. Such an arrangement can provide that little or no bending occurs in the forwardmost portion of elongate member 10. Rather, the majority of any bending will occur in a central portion 13 of elongate member 10 (specifically, a central portion 13 of metal sheet 20), between the rearward end of spar 32 and stationary end 11 of member 10, as evident in FIG. 4. It will be evident that in some instances this effect may only occur with bending in one direction, depending on whether such a spar is present on the upper side of the metal sheet, the lower side, or both. In various embodiments, such a stiffening spar may extend along from 5, 10, 15, or 20%, to 50, 40 or 30%, of the total elongate length of elongate member 10 and/or of a metal sheet 20 thereof. In the Figures herein, stiffening spar 32 is depicted as being provided as a separate entity from elongate metal sheet 20 (e.g. is a rearward extension of engaging head 30); however, in some embodiments such a stiffening element may be built into metal sheet 20 e.g. as a thickened portion, a folded portion, or the like.

A cable guide 1 as disclosed herein can be disengaged from a safety cable 1001 by the action of a cable sleeve 1060 that, as it travels along the safety cable, contacts the engaging end 12 of elongate member 10 of cable guide 1. Until deflected by the cable sleeve, the engaging end 12 of the cable guide 1 will be in the above-described first, home position in which end 12 is engaged with the safety cable as shown in FIG. 2, by way of the attractive force between the magnet 60 of the cable guide, and the metal of the safety cable (or a metal of a sheath that is provided on the safety cable, as discussed later). As illustrated in generic representation in FIG. 4, a cable sleeve 1060 (in this instance, traveling upward as indicated by arrow 18) will contact the engaging end 12 of elongate member 10 of the cable guide and will urge end 12 upward as the cable sleeve continues to move upward. The engaging end 12 of elongate member 10 will necessarily follow an upward-arcuate path (as indicated by arrow 16 in FIG. 3) which will overcome the magnetic attraction and cause the engaging end 12 to completely disengage from the safety cable so as to arrive at a configuration of the general type depicted in FIG. 4. This will allow the cable sleeve to move past the cable guide. Once the cable sleeve has moved on, the biasing force provided by the piece of sheet metal 20 will cause elongate member 10 to immediately return to its previous configuration. Thus, the engaging end 12 of elongate member 10 will return to its first, home position and will reengage with the safety cable, thus returning to a configuration as seen e.g. in FIG. 2. This disengaging and reengaging can all be done automatically as a result of the cable sleeve moving along the safety cable, without the user having to purposefully manipulate the safety cable, the cable guide, or the cable sleeve. That is, the user (who is typically wearing a harness that is connected to the cable sleeve) can simply climb a ladder, the cable sleeve moving along the safety cable as he or she climbs, with the cable sleeve automatically disengaging the cable guide as it moves past the cable guide, after which the cable guide automatically reengages with the safety cable. This can continue for any number of cable guides that are present along the length of the cable. A similar sequence can happen upon descent, with the engaging end 12 being deflected downward (as indicated by arrow 17 of FIG. 3) to effect the disengagement rather than being deflected upwards to affect the disengagement as occurs when climbing.

It will be appreciated that a magnet 60 as installed in an engaging head 30 in the general manner shown in FIG. 6, will necessarily follow an arcuate path as the engaging end 12 of the elongate member 10 of the cable guide 1 is arcuately deflected in the manner described above. In many embodiments, such a magnet 60 may comprise a major plane (for example, the magnet may take the form of an axially-magnetized disc or drum-shaped magnet as in FIG. 6, with the major plane of the magnet corresponding to the forward face 61 of the magnet). In such a circumstance, as the engaging end 12 of elongate member 10 is deflected, the major plane of the magnet will necessarily follow an arcuate path along the above-described single, predetermined plane; moreover, the major plane of the magnet will be tangent to the arcuate path at all points along the arcuate path.

It will be appreciated that such an arrangement allows the magnet to be separated from the safety cable by being moved initially parallel to the long axis of the safety cable, then gradually rotating away from the safety cable and increasing the separation distance along an arcuate path.

Such a separation process can require much less force than, for example, moving the magnet linearly away from the safety cable in a direction perpendicular to the long axis of the safety cable. These arrangements can allow that a magnet with a suitably strong magnetic force can be used (e.g. to ensure that the cable guide is capable of holding the cable in place during high winds or similar circumstances), while nevertheless allowing the cable guide to be disengaged from the cable easily and automatically when desired, as described above.

The actual amount to which the engaging end 12 of the elongate member 10 arcuately deflects when moving from a first, home position to a second, deflected position may be characterized by a deflection angle. Such an angle can be measured with reference to the forwardmost surface 61 of magnet 60 as present in engaging head 30, at a location at the geometric center of this forwardmost surface 61. (In the exemplary depiction of FIG. 4, this location will be very close to the dashed end of line 60 as drawn, that indicates the location of the magnet.) The angle can be measured from a vertex that is at the forwardmost location at which stationary end 11 of elongate member 10 is constrained from bending, e.g. by a bracket 50. (In the exemplary depiction of FIG. 4, this location will be very close to the end of line 11 as drawn).

In various embodiments, the deflection angle that is achieved when the engaging end 12 of elongate member 10 is deflected to its maximum extent, may be at least 20, 30, 40, 50 or 60 degrees. In further embodiments, such a deflection angle may be at most 90, 80, or 70 degrees. By way of a specific example, the exemplary illustration of FIG. 4 depicts a deflection angle that is in the range of approximately 65-70 degrees.

The at least one magnet 60 may be made of any magnetic material that, in the chosen configuration, provides a suitable attractive force. In some embodiments, such a magnet may be made of a ceramic (ferrite) composite, comprising e.g. powdered iron oxide and barium/strontium carbonate. In some embodiments, such a magnet may be made of an alloy such the so-called Alnico (iron-aluminum-nickel-cobalt) materials. In some embodiments, such a magnet may be made of an Al—Mn alloy. In some embodiments, such a magnet may be a rare-earth magnet of any suitable composition. In some specific embodiments, such a magnet may comprise neodymium (e.g., grade N52). Any such magnet may be coated (e.g. with nickel, copper, gold, or zinc, and/or with an organic polymeric layer such as an epoxy) e.g. in order to protect the magnetic material from abrasion, corrosion, and so on.

Such a magnet can be obtained in any suitable size and shape, e.g. as a bar, block, cube, disk, cylinder, ring, arc, or sphere. In some instances a generally-cylindrical magnet that is disc, button or drum-shaped may be used. The strength of any such magnet may be characterized by its attractive (pull) force. Pull forces of various magnetic materials, of various sizes and shapes, are available from KJ Magnetics, Pipersville, PA. In various embodiments, a magnet as used herein may exhibit a pull force of at least about 1.0, 1.5, 2.0, 2.5, 3.0, 4.0, or 5.0 pounds. Such a magnet may be magnetized along any desired direction. For example, a cylindrical or button magnet may be axially magnetized or diametrically magnetized; a bar magnet may be magnetized along any desired axis, and so on, as long as the magnet is oriented to achieve the desired attractive force.

A magnet 60 may be mounted to engaging head 30 (e.g. inserted into a dedicated receptacle 31 of engaging head 30) in any desired manner. In some embodiments, an adhesive or potting material (e.g. a photocurable adhesive, a thermally curable adhesive, a moisture-curable adhesive, and so on) may be used to bond the magnet to the engaging head. In some embodiments, multiple magnets may be used. For example, first and second magnets may be installed in first and second receptacles provided in the forward end of engaging head 30. In such a case, the first and second magnets may be positioned at the same location along the longitudinal axis of the elongate member (e.g. so that they are both approximately the same distance from the cable when the cable is engaged with the cable guide). The magnets may be spaced apart from each other along a direction that is perpendicular to the major plane exhibited by the piece of sheet metal, as illustrated for magnets 60 and 62 as indicated in exemplary manner in FIG. 7.

Figure 8:
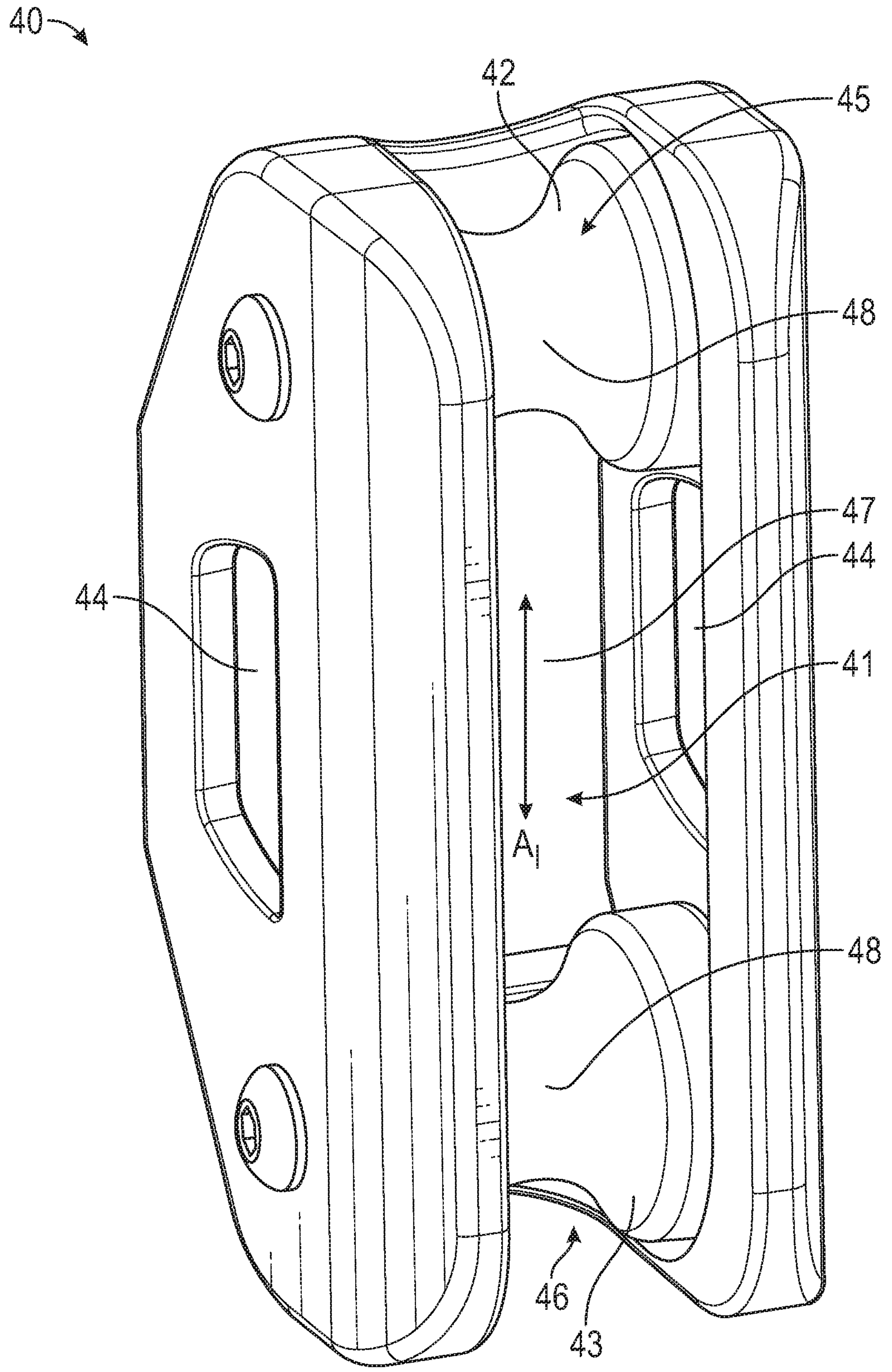
FIG. 8 is a perspective view of an exemplary rocker of an exemplary cable guide.

In some embodiments cable guide 1 may be configured so that the engaging end 12 of elongate member 10 comprises a rocker 40 that is non-detachably (and in some embodiments, pivotally) mounted on engaging head 30, as seen in FIG. 5 and in the exploded view of FIG. 6. Rocker 40 may define a forwardly-open-ended channel 41 (most easily seen in the isolated view of rocker 40 in FIG. 8) that is configured to receive a safety cable 1001 thereinto when the cable guide is in its first, home position, as evident in FIG. 2. Forwardly-open-ended channel 41 may be elongate with a long axis Ai (as indicated in FIG. 8) that is aligned with the previously-described single, predetermined plane along which the engaging end 12 of elongate member 10 is arcuately deflectable, as will be evident e.g. from FIGS. 2 and 3. In many embodiments, this long axis of channel 41 will also be perpendicular to the major plane of the elongate piece of sheet metal 20 of elongate member 10, also as evident from FIGS. 2 and 3.

Figure 7:
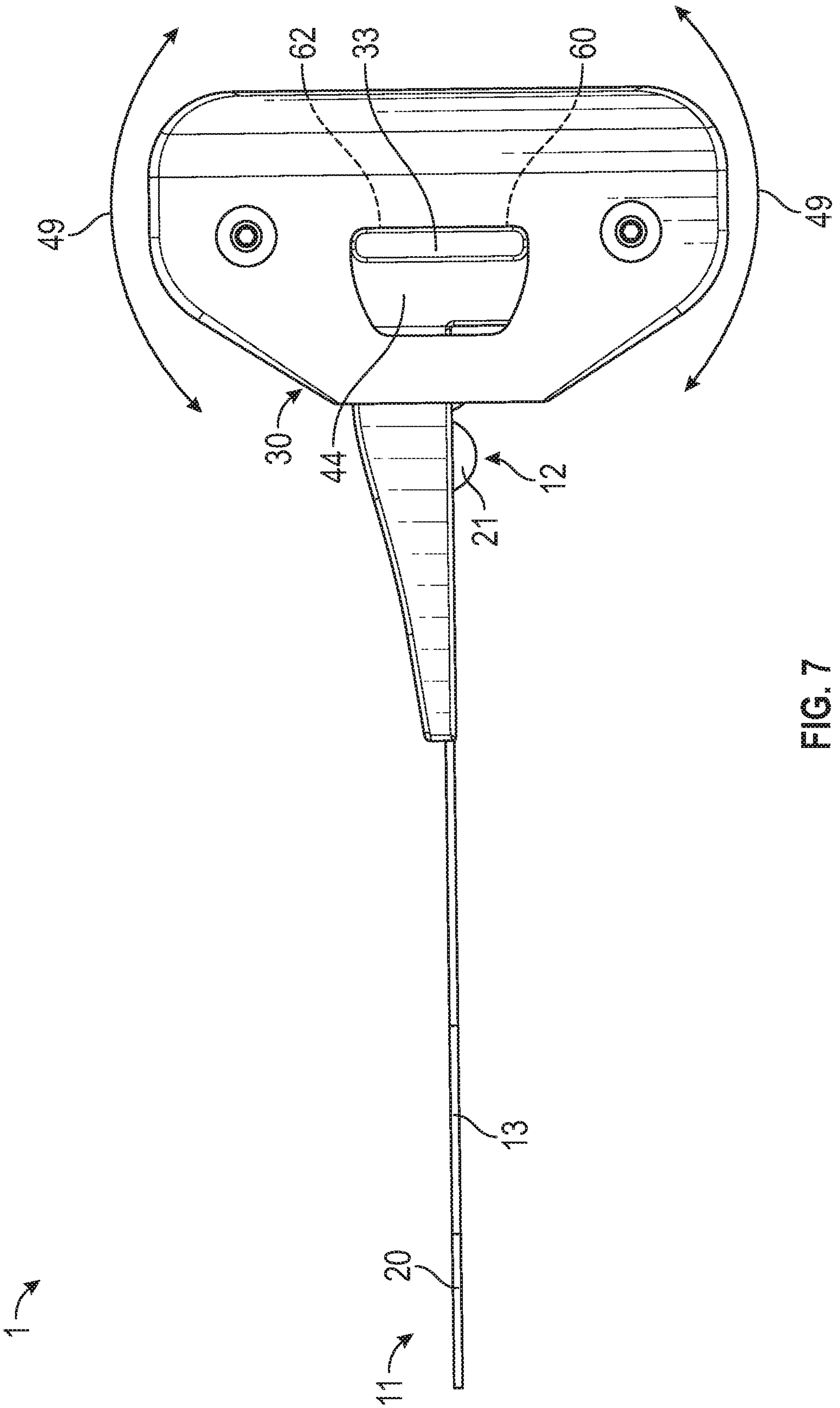
FIG. 7 is a side view of the exemplary cable guide of FIG. 5.

In some embodiments, rocker 40 may be pivotable back and forth relative to engaging head 30, as indicated by arrows 49 in FIG. 7. Such pivoting will be in a plane that coincides with the previously-described single, predetermined plane along which the engaging end 12 of elongate member 10 is arcuately deflectable, as will be evident from FIG. 7. In some embodiments, rocker 40 may be biased toward a "neutral" position (an unrotated position shown in FIGS. 2-8). However, in other embodiments it may not be necessary that rocker 40 be biased (e.g., rocker 40 may naturally be urged into the "neutral" position by the pressure of the safety cable 1001 on rocker 40). Thus, in some embodiments rocker 40 may not be biased in any particular manner.

In some embodiments, rocker 40 may comprise a molded plastic main body as evident in FIG. 8. In some embodiments, rocker 40 may comprise first and second transverse cavities 44 (which, in the illustrated embodiment, are through-holes) that are designed to accept complementary bosses 33 of engaging head 30 in order to pivotally mount rocker 40 on engaging head 30. As evident in FIG. 7, cavities 44 and bosses 33 can be shaped and sized to allow the desired amount of pivotal motion of rocker 40 relative to engaging head 30 (and thus relative to the long axis of elongate member 10). In various embodiments, rocker 40 may be able to pivot relative to engaging head 30, through an angle of at least plus or minus 10, 15, 20, or 25 degrees (relative to a "neutral" position as shown in FIG. 7). In further embodiments, rocker 40 may be able to pivot through an angle of at most plus or minus 60, 50 or 40 degrees. (By way of a specific example, the design illustrated in FIG. 7 will allow rocker 40 to pivot relative to engaging head 30, through an angle of approximately plus or minus 30 degrees.)

In some embodiments, rocker 40 may comprise at least one roller, e.g. first and second rollers 42 and 43 that are spaced along the long axis of forwardly-open-ended channel 41. In some embodiments, such rollers may be concave as in FIG. 8, with a profile that is shaped to match the outer diameter of the safety cable 1001 that the cable guide is used with. In some embodiments, the longitudinal ends of channel 41 (that is, upper end 45 and lower end 46 as indicated in FIG. 8) may be open (unobstructed) as in FIG. 8, rather than any sort of "roof" or "floor" being present at those locations.

From the discussions herein it will be appreciated that any or all of these features (rocker 40 being pivotable with respect to engaging head 30; the presence of rollers 42 and 43; the ends of channel 41 being open rather than closed), singly or in any combination, may enhance the functioning of the herein-disclosed cable guide in various ways. For example, such features may allow the safety cable 1001 to remain at least partially seated within channel 41 for as long as possible during the deflection process. In another example, the ability of rocker 40 to pivot about the engaging end 12 of the cable guide may allow the engaging end of the cable guide to be disengaged from the safety cable without the engaging end necessarily having to be deflected to as large a deflection angle as might otherwise be necessary. In this regard, it is noted that FIG. 4 is a generic, representative illustration in which rocker 40 is depicted as remaining in its "neutral" position rather than having been rotated in a manner indicated in FIG. 7. In actuality, the impinging of cable sleeve 1060 on rocker 40 in the general manner indicated in FIG. 4 may cause rotation of rocker 40 about engaging end 12 that may somewhat reduce the deflection angle to which engaging end 12 of the cable guide must be deflected in order for the disengaging to be accomplished. Any such features may also enhance the ability of the engaging end of the cable guide to automatically re-engage with safety cable.

Rocker 40 may provide another useful function. Specifically, rocker 40 may serve as a physical buffer that ensures that, when cable sleeve 1060 encounters cable guide 1, the magnet(s) of the cable guide does not exert enough magnetic force on the body of the cable sleeve (which may comprise numerous metal components) to enable the engaging end 12 of the cable guide to attach to the cable sleeve, or to interact with the sleeve in such as way as would disrupt the passage of the cable sleeve past the cable guide. In other words, the rocker (particularly when made of a non-magnetically-susceptible material such as e.g. a molded organic polymeric material) can act as a spacer that ensures that the magnet(s) of the cable guide remains a minimum distance away from all components of the sleeve. At the same time, the presence of channel 41 into which safety cable 1001 can fit, ensures that rocker 40 does not prevent cable 1001 from being approached closely by the engaging head and its magnet(s) to allow the engaging end to engage with cable 1001 in the manner desired.

Beyond this, certain features of rocker 40 may be configured to serve another useful function. With rocker 40 in place on engaging head 30, the forward end of engaging head 30, bearing magnet 60 thereon, will be positioned in a space 47 of rocker 40 that is allocated for that purpose. In some embodiments, rocker 40 may be configured so that the rearward boundary of forwardly-open-ended channel 41 is forwardly spaced apart (e.g. at least 0.1, 0.2, 0.5, 1.0, 1.5, or 2.0 mm) from the forwardmost surface (e.g. major surface 61) of magnet 60. In the depicted embodiment, the rearward boundary 48 of channel 41 will be provided by the rearmost forward surfaces (that is, the deepest extent) of rollers 42 and 43, as indicated in FIG. 8. Such arrangements can ensure that when the safety cable 1001 is seated in channel 41, a gap (e.g. an air gap) of at least e.g. 0.5, 1.0, 1.5, 2.0, 2.5, or 3.0 mm will be present between a rearmost surface of the safety cable and the forwardmost surface 61 of magnet 60. In various embodiments, such a gap may be at most 10, 8.0, 6.0, or 4.0 mm. For purposes of measuring such a gap, the forwardmost surface 61 of magnet 60 will be the forwardmost surface of the actual magnetic material of the magnet, disregarding any protective layer or coating (e.g. a nickel or epoxy coating of the general type mentioned earlier herein) that may be present on the forward surface of the actual magnetic material of the magnet. In many embodiments, any such layer may be thin enough that there is still an air gap between the forwardmost surface of the protective layer and the rearmost surface of the safety cable.

It has been found that the presence of such a gap can significantly enhance the ability to disengage the cable guide from the safety cable. If no such gap is present (e.g., if the front surface of the magnet is actually in contact with the safety cable), the magnetic force, along with the coefficient of static friction between the two surfaces, can cause that a significant force may be needed in order to initiate motion of the magnet relative to the safety cable. The providing of a gap (even if rather small) between these two surfaces can significantly reduce the force required to initiate disengagement, without unacceptably reducing the force with which the magnet holds the safety cable in the engaged position.

It will be appreciated that such an air gap does not necessarily have to be achieved by way of features of rocker 40. Rather, engaging head 30 into which magnet 60 is installed, may be configured to similar ends. For example, magnet 60 might be inserted into a receptacle 61 that allows the front surface 61 of magnet 60 to be recessed rearwardly from the major front surface of engaging head 30. Still further, in some embodiments at least a portion of any such gap may comprise a low-friction material (e.g. a poly (tetrafluoroethylene) layer, coating, or the like) rather than being an entirely air-filled gap.

It will be appreciated that many variations of the above-discussed arrangements are possible. For example, rather than using a piece of "springy" sheet metal 20 that exhibits an inherent bias to return to a flat configuration (and thus to return the cable guide to its first, home position), elongate member 10 could comprise some other material (of any suitable shape and composition). Such a member could be rigid with a stationary end of the material being hingedly attached to a support to allow the member to rotate through an arcuate path; or, the member could be flexible so as to flexibly deform along an arcuate path. In either case, the member (or members) can be used in combination with any suitable biasing mechanism. For example, such a member could be used in combination with one or more torsion springs that provide the necessary biasing (two such springs may be optimum to account for the two-way biasing that is needed to allow disengagement/engagement from the cable sleeve traveling upward, or traveling downwards).

In some embodiments, an elongate member (of any type and composition) 10 of cable guide 1 can be length-adjustable (along the longitudinal axis of the cable guide) to account for the stand-off distance at which a particular safety cable is mounted relative to a ladder. Similarly, the biasing force may be altered to provide that at the particular stand-off distance that is used, the force that is required to disengage the cable guide from the safety cable is appropriately set. Such a scheme might involve, for example, the use of an elongate "member" that includes multiple layers of sheet metal that can be slidably moved relative to each other to achieve a particular combination of length and/or biasing force. It will be appreciated based on the discussions herein that many such variations and optimizations are possible.

All discussions herein so far have concerned the use of magnetic force as the operative mechanism by which an engaging end of a cable guide can be engaged with a safety cable. In some embodiments, some other mechanism, e.g. a mechanical interaction such as a friction fit, may be used. For example, an engaging end of a cable guide may be fitted with a pair of deflectable flanges comprised of a suitably resilient material. Each flange may comprise a long axis that is generally parallel to the safety cable, with the flanges defining a space therebetween that is configured to accept and mechanically hold the safety cable therein and with the flanges being resiliently biased towards each other but being deflectable generally away from each other. The stiffness of the flange material may be chosen so that the flanges exert a suitable pinching force on the cable that will hold the cable until such time as the movement of a cable sleeve causes the flanges to be forcibly, momentarily deflected away from each other to disengage the engaging end of the cable guide from the cable as the engaging end follows the previously-described arcuate path. After passage of the cable sleeve, the engaging end will return to its home (engaged) position due to the restoring force of the elongate member of the cable guide in the general manner described earlier herein. The restoring force may be calibrated so that the engaging end of the cable guide impinges on the cable with sufficient force that the flanges are again momentarily deflected away from each other to allow the engaging end of the cable guide to re-engage with the safety cable.

It will be appreciated that other mechanical interactions are possible. For example, the engaging end of the cable guide may have a latch or clasp that is attached to the cable until detached by the impinging of the cable sleeve on the latch (in some embodiments the impinging may be by some dedicated component of the cable sleeve, e.g. a "cow-catcher" that is specifically designed and positioned to impinge on the latch in a specific manner that will detach it from the cable). The latch may then automatically re-attach to the cable after passage of the cable sleeve.

Any such mechanical engaging/disengaging mechanism can be used with the arrangements disclosed herein, i.e. in combination with an elongate member with an engaging end that is arcuately deflectable along an arcuate path that lies in a single, predetermined plane, from a first, home position to a second, deflected position, the elongate member being biased to urge the engaging end of the elongate member toward (e.g. into) the first, home position.

A safety cable 1001 with which a cable guide 1 is used may be of any suitable type and may be made of any suitable material, e.g. galvanized steel or stainless steel. In various embodiments, such a cable may be e.g. ⅜ inch or 5⁄16 inch diameter, and/or it may be of a 1×7 or 7×19 strand construction. It will be appreciated that certain materials (e.g. metals such as some galvanized steels) will inherently possess sufficient magnetic susceptibility that a safety cable comprised of such a material will be magnetically engagable in the manner described above, in an "as-is" condition. However, safety cables made of other materials (e.g. certain stainless steels, and of course safety cables made of an organic polymeric material) may not possess sufficient magnetic susceptibility to be useable as-is. In some such cases, the safety cable may be fitted with a metal sheath 1070 (of, e.g., a few cm in elongate length) as indicated in generic representation in FIG. 1, at any location at which it is desired to have the safety cable be held by a cable guide. Such a sheath may be made of any suitable metal with sufficient magnetic susceptibility and may be attached to the safety cable, and fixed at a desired location along the elongate length of the cable, e.g. by adhesive bonding, by crimping, and so on. Any such sheath will be configured so that it is compatible with the use of the safety cable and the associated cable sleeve.

In some embodiments, the magnet(s) may be chosen and arranged so as to be compatible with a safety cable that exhibits a moderate magnetic susceptibility, without necessarily requiring the usage of a metal sheath. For example, an arrangement of the general type described earlier herein may be used, in which first and second magnets are positioned alongside each other in the general manner illustrated for magnets 60 and 62 in FIG. 7. In other words, such magnets may be disposed, at any suitable spacing, along a direction that will be at least generally aligned with the long axis of the safety cable when the engaging end of the cable guide is in its home (engaged) position). It has been found that two such magnets positioned in this manner, when used with a metal safety cable of relatively low magnetic susceptibility (such as e.g. Grade 304 stainless steel), can achieve a similar holding power as that exhibited by a single such magnet when used with a metal cable of relatively high magnetic susceptibility (such as many galvanized steel cables). Thus, such arrangements may eliminate any need to apply a metal sheath to such a safety cable.

The herein-disclosed arrangements can be used in any situation in which fall protection during vertical climbing (and/or descending) is desired. This is not limited to situations involving ladders of the general type shown in FIG. 1. For example, a cable guide 1 may be used with a fall protection system that is installed on a so-called monopole as shown in exemplary embodiment in FIG. 9 of International Patent Application (PCT) Publication WO 2019/126135 and in the resulting U.S. patent application Ser. No. 15/733,190. Such a monopole may comprise a ladder collectively provided by outwardly-protruding rungs (posts) as depicted in the US'190 application. It is thus emphasized that the term "ladder" broadly encompasses any arrangement of rungs, steps, outcroppings, recesses, platforms, footholds, handholds, etc., that is configured to allow vertical or generally vertical climbing and/or descending by a human. (In this context a ladder is not necessarily required to be movable from place to place and will often be fixed in place.) The "rungs" of any such ladder are not limited to the above-described types, but may include e.g. members or beams of a lattice (truss) tower, and so on. A ladder and/or the rungs thereof of such a safety system may be made of any suitable material, e.g. metal, wood, polymeric materials, and so on. It is further noted that a cable guide 1 as disclosed herein need not necessarily be attached to a rung (or other component) of a ladder. Rather, such a cable guide may be attached to any suitable support that allows the guide to be properly positioned to stabilize the safety cable in proximity to the ladder.

A fall protection safety system comprising a cable guide as disclosed herein may find use in any application in which fall protection while climbing, descending, or maintaining a particular height is desired. Although discussions herein have mainly concerned exemplary uses that involve climbing above an access point (e.g. climbing up from a ground-level access point), the arrangements disclosed herein may also find use in applications that involve descending below an access point (e.g., into a cargo hold or tank of a ship, into a mine shaft or air shaft, into a grain bin, and so on). A vertical climbing fall protection safety system comprising a cable guide as disclosed herein may meet the requirements of any applicable standard. In various embodiments, such a safety system may meet the requirements of ANSI Z359.16-2016 (Safety Requirements for Climbing Ladder Fall Arrest Systems), as specified in 2016. In particular embodiments, such a safety system may meet the requirements of Section 4.2.1 (Dynamic Performance) and Section 4.2.2.4 (Static Strength) of this standard. In some embodiments, such a safety system may meet the requirements of OHSA rule 1926.1053, Section (a)(22)(i) (Dynamic Strength).

Discussions herein have primarily concerned the use of the herein-described cable guide with a vertical fall protection safety system. As defined herein, a vertical safety system is one in which the elongate axis of a safety cable of the system is oriented within plus or minus 15 degrees of vertical. A cable guide as disclosed herein may similarly be used with an angled safety system (defined herein as a system whose safety cable is oriented greater than 15 degrees away from vertical, and greater than 15 degrees away from horizontal) and/or with a horizontal safety system (defined as a system whose safety cable is oriented within plus or minus 15 degrees of horizontal). In such cases, the previous descriptions and characterizations of a cable guide with regard to the various directions of e.g. arcuate deflection, can be straightforwardly transformed (e.g. rotated 90 degrees) to apply to such configurations, as will be easily understood.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter.

What is claimed is:

1. A cable guide for stabilizing a safety cable of a fall protection system, comprising:

an elongate member that comprises a longitudinal axis, a stationary end, and an engaging end that is distal to the stationary end and that comprises at least one magnet, wherein the engaging end of the elongate member is arcuately deflectable along an arcuate path that lies in a single, predetermined plane, from a first, home position to a second, deflected position, and wherein the elongate member is biased to urge the engaging end of the elongate member into the first, home position.

2. The cable guide of claim 1 wherein the elongate member comprises an elongate metal sheet that exhibits a major plane and that has a long axis that defines the long axis of the elongate member; and, wherein the single, predetermined plane within which the engaging end of the elongate member is arcuately deflectable, is parallel to the long axis of the elongate metal sheet and is perpendicular to the major plane of the elongate metal sheet.

3. The cable guide of claim 2 wherein the engaging end of the elongate member comprises an engaging head that is non-detachably attached to a distal end of the elongate metal sheet and is non-movable relative to the elongate metal sheet, and wherein the at least one magnet is installed in a receptable provided in a forward end of the engaging head.

4. The cable guide of claim 3 wherein the engaging head is a molded plastic head that comprises at least one stiffening spar that extends rearward along at least one major surface of the elongate metal sheet.

5. The cable guide of claim 3 wherein the engaging end of the elongate member further comprises a rocker that is non-detachably, pivotally mounted on the engaging head and that defines a forwardly-open-ended channel that is configured to receive a safety cable thereinto.

6. The cable guide of claim 5 wherein the rocker is pivotable relative to the engaging head, in a plane that coincides with the single, predetermined plane within which the engaging end of the elongate member is arcuately deflectable.

7. The cable guide of claim 6 wherein the forwardly-open-ended channel of the rocker comprises a long axis that is aligned with the single, predetermined plane within which the engaging end of the elongate member is arcuately deflectable, and wherein the long axis of the channel is also perpendicular to the major plane of the elongate piece of sheet metal.

8. The cable guide of claim 5 wherein the rocker is a molded plastic rocker that is configured so that a rearward boundary of the forwardly-open-ended channel is at least 0.2 mm forward of a forwardmost surface of the at least one magnet, so that when the engaging end of the elongate member is engaged with a safety cable so that the safety cable is seated in the channel, a gap of at least 0.2 mm is present between a rearmost surface of the safety cable and the forwardmost surface of the at least one magnet.

9. The cable guide of claim 8 wherein the molded plastic rocker comprises first and second concave rollers that are spaced along a long axis of the forwardly-open-ended channel.

10. The cable guide of claim 3 wherein the at least one magnet that is installed in the receptable in the forward end of the engaging head exhibits a major plane; and, wherein when the engaging end of the elongate member is arcuately deflected within the single, predetermined plane, the magnet follows an arcuate path within the single, predetermined plane with the major plane of the magnet being tangent to the arcuate path at all points along the arcuate path.

11. The cable guide of claim 3 wherein the at least one magnet is in the form of first and second magnets that are installed in first and second receptacles provided in the forward end of the engaging head so that the first and second magnets are at the same location along the longitudinal axis of the elongate member and are spaced apart from each other along a direction that is perpendicular to the major plane exhibited by the piece of sheet metal.

12. A fall protection system, comprising:

a cable guide comprising an elongate member that comprises a longitudinal axis, a stationary end, and an engaging end that is distal to the stationary end and that comprises at least one magnet, and, a safety cable that is magnetically, disengagably engagable with the engaging end of the elongate member of the cable guide and that has a long axis that is perpendicular to the longitudinal axis of the elongate member of the cable guide, wherein the engaging end of the elongate member is arcuately deflectable along an arcuate path that lies in a single, predetermined plane that is aligned with a long axis of the safety cable and that is aligned with a long axis of the elongate member of the cable guide, from a first, home position in which the safety cable is magnetically, disengagably engaged with the engaging end of the elongate member of the cable guide, to a second, deflected position in which the safety cable is disengaged from the engaging end of the elongate member of the cable guide, and further wherein the elongate member is biased to urge the engaging end of the elongate member into the first, home position.

13. The fall protection system of claim 12, wherein the fall protection system is a vertical fall protection system and wherein the long axis of the safety cable is vertically aligned and the single, predetermined plane along which the elongate member is arcuately deflectable is vertically aligned.

14. The fall protection system of claim 12, wherein the safety cable comprises a metal sheath that is fixedly disposed on the safety cable at a location at which it is desired to engage the engaging end of the elongate member of the cable guide with the safety cable.

15. The fall protection system of claim 12, wherein the fall protection system is installed in proximity to a ladder to provide fall protection for a person using the ladder, and wherein the stationary end of the cable guide is attached to a rung of the ladder.

16. The fall protection system of claim 12, further comprising a cable sleeve that is configured to be attached to a harness of a worker by way of a connection that includes at least one shock absorber, wherein the cable sleeve is mounted on the safety cable and is configured to travel along the safety cable as the worker moves along the safety cable.

17. A method of using a fall protection system comprising a cable guide comprising an elongate member that comprises a longitudinal axis, a stationary end, and an engaging end that is distal to the stationary end and that comprises at least one magnet, and, a safety cable that is magnetically, disengagably engagable with the engaging end of the elongate member of the cable guide and that has a long axis that is perpendicular to the longitudinal axis of the elongate member of the cable guide, wherein the engaging end of the elongate member is arcuately deflectable and wherein the method comprises:

moving a cable sleeve along the safety cable so that the cable sleeve contacts the engaging end of the elongate member and urges the engaging end to arcuately deflect so that the engaging end of the elongate member arcuately moves from a first, home position in which the safety cable is magnetically, disengagably engaged with the engaging end of the elongate member of the cable guide, to a second, deflected position in which the safety cable is disengaged from the engaging end of the elongate member of the cable guide so that the cable sleeve can move along the safety cable past the cable guide.

18. The method of claim 17 comprising the further step of moving the cable sleeve farther along the safety cable so that the cable sleeve is no longer in contact with the engaging end of the elongate member so that the engaging end of the elongate member returns to its first, home position and reengages with the safety cable.

19. The method of claim 17 wherein the moving of the cable sleeve causes the engaging end of the elongate member to arcuately deflect relative to the stationary end of the elongate member, to a deflection angle of at least 60 degrees.

20. The method of claim 17 wherein the cable sleeve is connected to a harness of a user of the fall protection system and wherein the cable guide is disengaged from the safety cable, and is reengaged with the safety cable, automatically as a result of the user and the cable sleeve moving along the safety cable, without the user having to purposefully manipulate the safety cable, the cable guide, or the cable sleeve.

* * * * *